(12) United States Patent
Martin et al.

(10) Patent No.: US 9,290,265 B2
(45) Date of Patent: Mar. 22, 2016

(54) MAIN LANDING GEAR COMPACT AXLE STEERING

(71) Applicant: Goodrich Corporation, Charlotte, NC (US)

(72) Inventors: Dennis W. Martin, Woodinville, WA (US); James Acks, Medina, OH (US)

(73) Assignee: Goodrich Corporation, Charlotte, NC (US)

( * ) Notice: Subject to any disclaimer, the term of this patent is extended or adjusted under 35 U.S.C. 154(b) by 296 days.

(21) Appl. No.: 13/774,218

(22) Filed: Feb. 22, 2013

(65) Prior Publication Data

US 2014/0239119 A1 Aug. 28, 2014

(51) Int. Cl.
*B64C 25/10* (2006.01)
*B64C 25/50* (2006.01)
*B64C 25/34* (2006.01)

(52) U.S. Cl.
CPC ............... *B64C 25/50* (2013.01); *B64C 25/34* (2013.01); *B64C 2025/345* (2013.01)

(58) Field of Classification Search
CPC .... B64C 25/14; B64C 25/50; B64C 2025/325
USPC .................................... 244/50, 102 R, 102 A
See application file for complete search history.

(56) References Cited

U.S. PATENT DOCUMENTS

| 3,643,898 | A | | 2/1972 | Whitener et al. |
| 5,242,131 | A | * | 9/1993 | Watts ........................ 244/103 W |
| 5,513,821 | A | | 5/1996 | Ralph |
| 5,595,359 | A | * | 1/1997 | Meneghetti ..................... 244/50 |
| 5,613,651 | A | | 3/1997 | Meneghetti |
| 5,743,491 | A | | 4/1998 | Meneghetti |
| 6,123,292 | A | | 9/2000 | Ralph |
| 6,641,085 | B1 | | 11/2003 | Delea et al. |
| 6,671,588 | B2 | | 12/2003 | Otake et al. |
| 6,805,320 | B2 | | 10/2004 | Derrien et al. |
| 8,136,759 | B2 | * | 3/2012 | Lavigne et al. ........... 244/102 R |
| 8,376,267 | B2 | * | 2/2013 | Coles et al. ..................... 244/50 |
| 8,668,163 | B2 | * | 3/2014 | Colantonio et al. ............ 244/50 |
| 2010/0078517 | A1 | * | 4/2010 | Coles et al. ..................... 244/50 |
| 2011/0215192 | A1 | * | 9/2011 | Colantonio et al. ............ 244/50 |

* cited by examiner

*Primary Examiner* — Brian M O'Hara
*Assistant Examiner* — Keith L Dixon
(74) *Attorney, Agent, or Firm* — Kinney & Lange, P.A.

(57) ABSTRACT

A landing gear system comprises a bogie beam, a landing gear axle pivotally mounted to the bogie beam, a steering rack, a linear actuator assembly, and a steering control link. The steering rack is secured transversely to the bogie beam and is longitudinally spaced apart from the landing gear axle. The linear actuator assembly is operable to laterally translate the steering rack. The steering control link is longitudinally extendable and has an actuator end secured to the steering rack, and an axle end of the steering control link engaged with the landing gear axle. The steering control link and the landing gear axle are pivotable relative to the bogie beam about a common axis.

19 Claims, 7 Drawing Sheets

MAIN LANDING GEAR COMPACT AXLE STEERING

BACKGROUND

The described subject matter relates generally to aircraft landing gears, and more specifically to steering systems for aircraft landing gears.

Landing gear for large aircraft have traditionally employed a telescoping shock-absorbing strut with a multi-wheel truck attached. Such structures can effectively handle and react the various forces seen during taxiing. In order to assist in turning the aircraft, reduce side loads acting upon landing gear during turns, and reduce tire scrubbing, main landing gears with six wheeled or greater bogie beam configurations have utilized a steerable aft and/or forward axle. Most common approaches to provide for axle steering utilizing hydraulic actuators that directly or indirectly push or pull the axle to the desired steering angle. Traditional push-pull steering systems are sized to produce enough steering torque at the minimum moment arm. As a result, the available steering torque is higher than required for most of the steerable range.

To alleviate certain issues with false steering angle feedback in push-pull actuated steering mechanisms, a system was developed by which an actuator is mounted transversely to a bogie beam, with steering movement transferred from the actuator to the axle via a rack-and-pinion arrangement. While effective for its intended purpose, the rack-and-pinion gears require more frequent maintenance as compared to a push-pull steering system due to oxidation and infiltration of contaminants into the gear teeth.

SUMMARY

A landing gear system comprises a bogie beam, a landing gear axle pivotally mounted to the bogie beam, a steering rack, a linear actuator assembly, and a steering control link. The steering rack is secured transversely to the bogie beam and is longitudinally spaced apart from the landing gear axle. The linear actuator assembly is operable to laterally translate the steering rack. The steering control link is longitudinally extendable, has an actuator end secured to the steering rack, and an axle end of the steering control link engaged with the landing gear axle. The steering control link and the landing gear axle are pivotable relative to the bogie beam about a common axis.

A steering arrangement for a pivotable landing gear axle comprises a steering rack, a linear actuator assembly operable to laterally translate the steering rack, and a steering control link. The control link is longitudinally extendable and includes an actuator end secured to the steering rack. An axle end of the control link disposed opposite the actuator end is pivotable about a control link pivot point.

DETAILED DESCRIPTION

Figure 1:
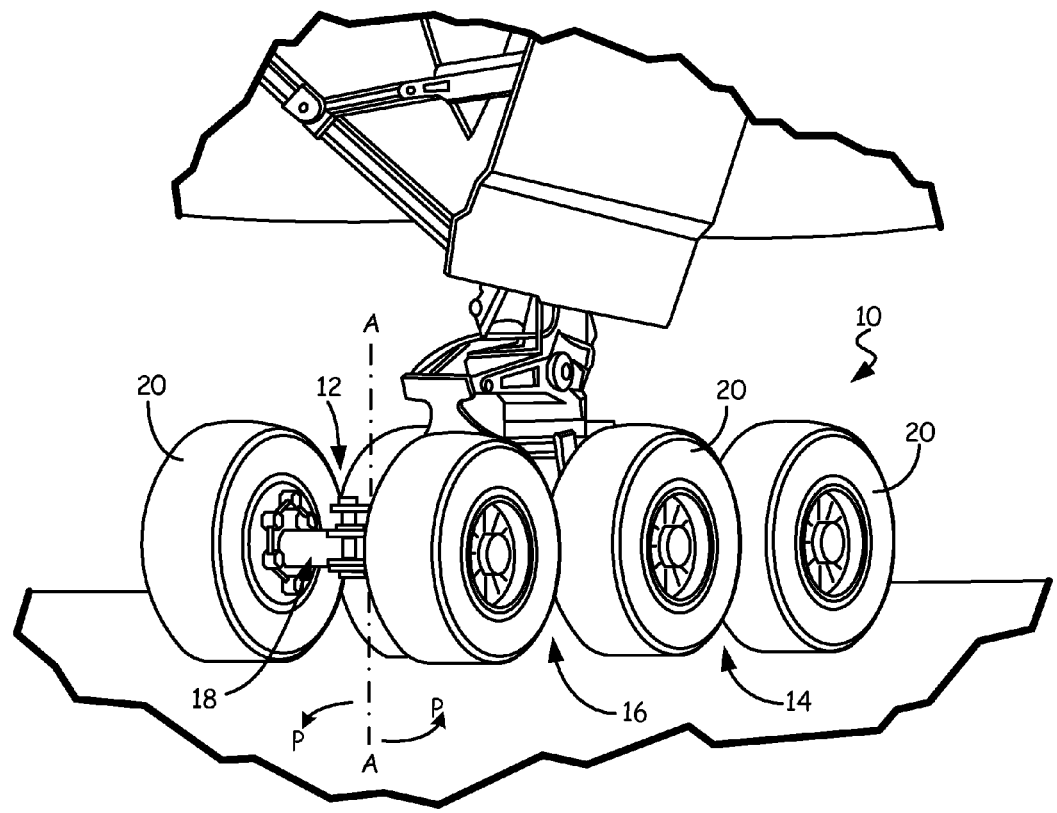
FIG. 1 schematically depicts an example main landing gear assembly for an aircraft.

FIG. 1 shows an example main landing gear system 10 for an aircraft. In this example, main landing gear system 10 is shown as having a three-axle bogie beam configuration with six wheels. Main landing gear system 10 generally includes bogie beam 12, fixed forward axle 14, fixed center axle 16, and aft axle 18. Each axle 14, 16, 18 is mounted transversely to bogie beam 12, and each includes two wheels 20 on either side of bogie beam 12. As indicated by arrows P, aft axle 18 is steerable by pivoting or rotating axle 18 about axis A.

The steering system, an example of which is shown in subsequent figures, can be used to control one or more axles mounted to a bogie-style landing gear system, such as, but not limited to, a six-wheel landing gear system having three two-wheel axles. While this example is described with respect to forward axle 14 and center axle 16 being fixed with respect to the bogie beam 12, it will be appreciated that the described subject matter can be readily adapted to additionally and/or alternatively fix aft or other axles. While this example is described with respect to aft axle 18 being steerable/pivotable with respect to the bogie beam 12, it will be appreciated that the described subject matter can be readily adapted to additionally and/or alternatively steer/pivot forward, center or other axles. For example, axle steering arrangements may be provided to steer multiple pivotable axles such as a forward axle and an aft axle on the same bogie beam.

Figure 2:
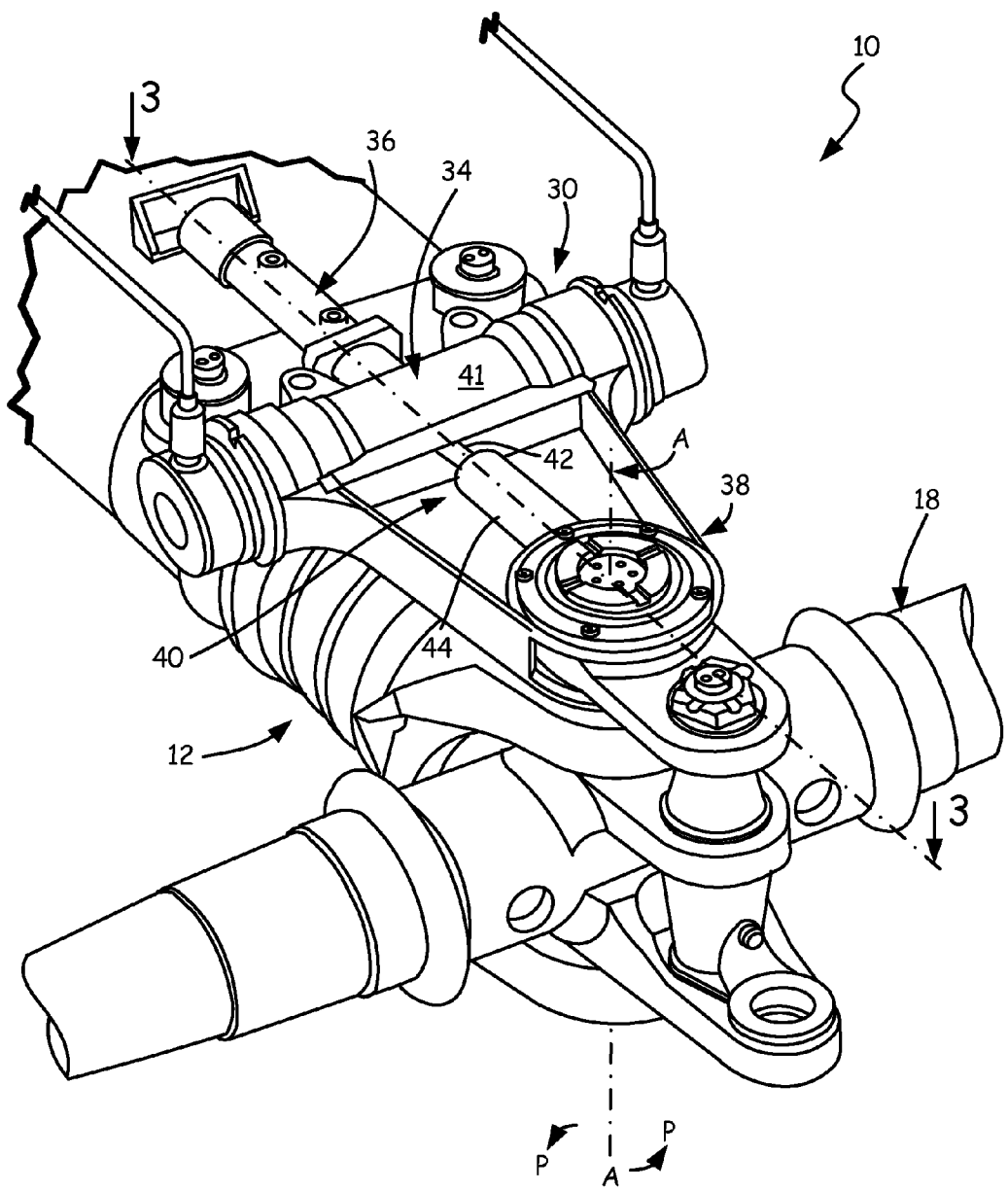
FIG. 2 shows the main landing gear assembly with a compact axle steering arrangement.

FIG. 2 is a perspective view of an aft portion of main landing gear system 10. FIG. 2 shows axle steering arrangement 30 which is adapted to control steering of aft axle 18 about bogie beam 12. FIG. 2 also shows linear actuator assembly 34, locking mechanism 36, actuator compartment 38, control link 40, cover 41, control link actuator end 42, and control link axle end 44.

Main landing gear system 10 includes axle steering arrangement 30 mounted to bogie beam 12. Here, axle steering arrangement 30 is operative to control steering of aft axle 18 which is pivotable about common axis A in clockwise and counterclockwise directions P. Common axis A is generally perpendicular to, and extends through both bogie beam 12 and aft axle 18.

Axle steering arrangement 30 generally includes linear actuator assembly 34, locking mechanism 36, and control link 40. Linear actuator assembly 34 is mounted transversely to bogie beam 12, and generally parallel to a neutral (e.g., 0°) steering position of aft axle 18. Locking mechanism 36 can be provided to lock aft axle 18 into a neutral or other steering position to prevent inadvertent steering inputs, outputs, or other movements. One or more elements of axle steering arrangement 30 can be retained in actuator compartment 38, which may be secured on, or formed directly into a recess in bogie beam 12. In certain embodiments, actuator compartment 38 comprises an opening formed as part of actuator housing 45 (shown in FIGS. 3A-3C) which houses actuator assembly 34 and control link 40. Cover 41 (partially cut away for clarity) can be placed over actuator compartment 38 to protect moving parts such as those contained in actuator assembly 34 and control link 40 from FOD and dirt.

Control link 40 includes actuator end 42 rotatably engaged with actuator assembly 34, and axle end 44 engaged with aft axle 18. Extendable control link 40 allows radial displacement of the control link 40, thereby allowing axle steering arrangement 30 to stroke to the desired position as defined by linear actuator assembly 34. As will be seen in more detail in FIGS. 3A-3C, linear actuator assembly 34 includes one or more pistons or other elements which can be actuated transversely relative to bogie beam 12. This translates actuator end 42 of control link 40 also in a transverse direction. In turn, lateral translation of actuator end 42 pivots axle end 44 in direction P and imparts a corresponding steering or pivoting motion to aft axle 18 about axis A. To maintain linkage between linear actuator assembly 34 and aft axle 18, and to efficiently transfer steering motion therebetween, control link 40 can be configured to longitudinally extend and retract as actuator end 42 is moved laterally to either side of bogie beam 12.

Figure 3A:
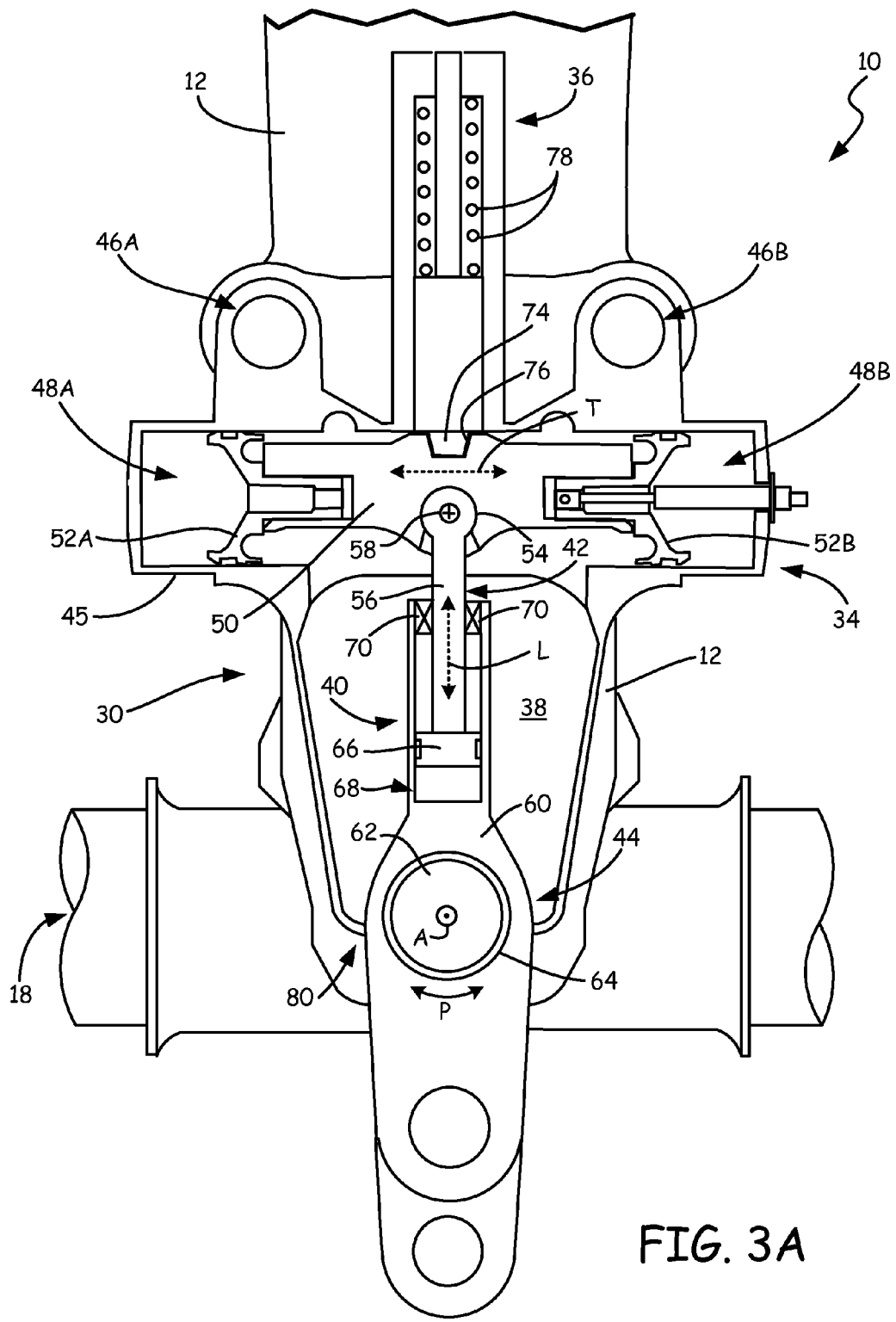
FIG. 3A is a sectional view of the main landing gear assembly showing the compact axle steering arrangement in a neutral steering position.
Figure 3B:
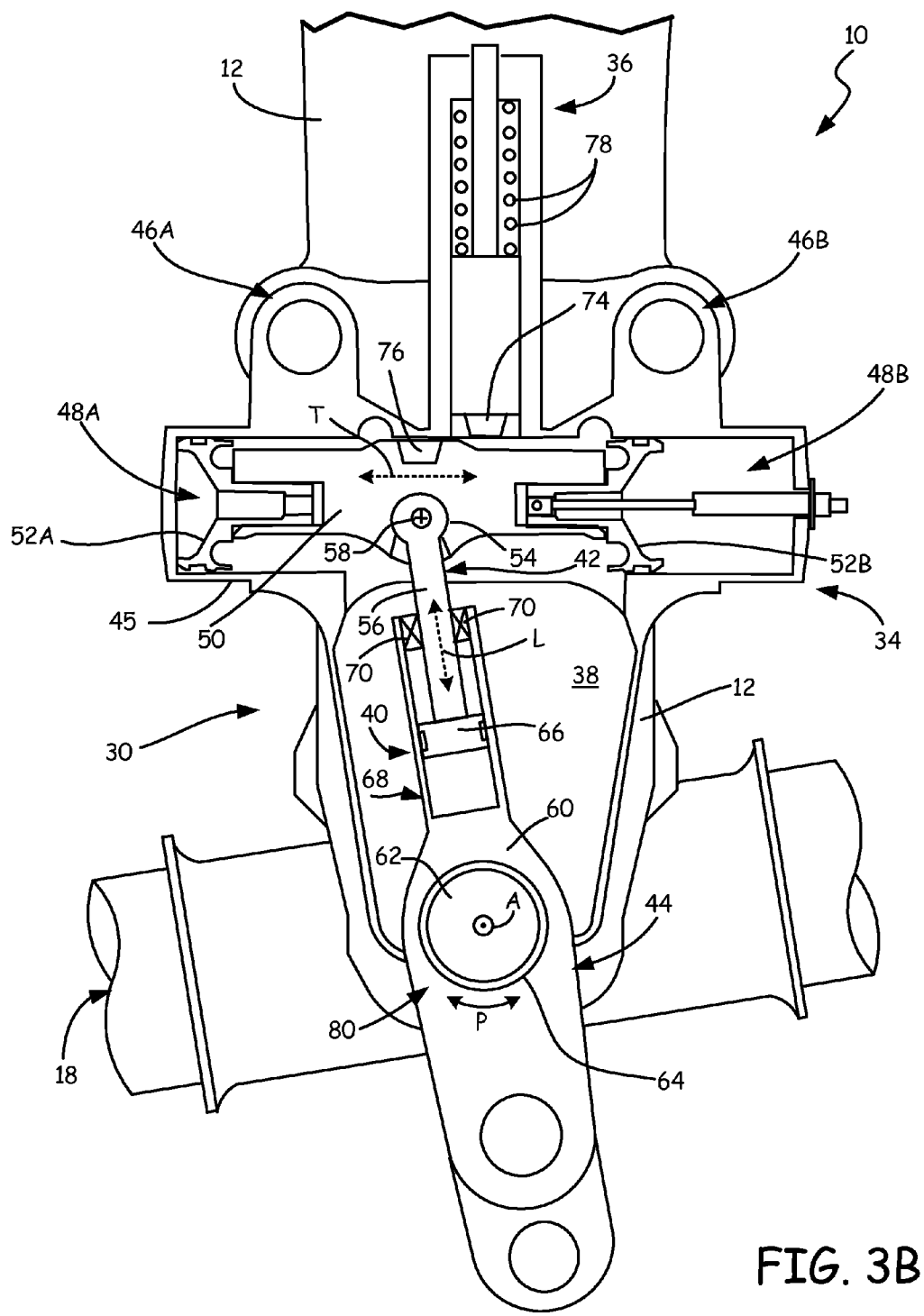
FIG. 3B is a sectional view of the main landing gear assembly showing the compact axle steering arrangement in a counterclockwise steering position.
Figure 3C:
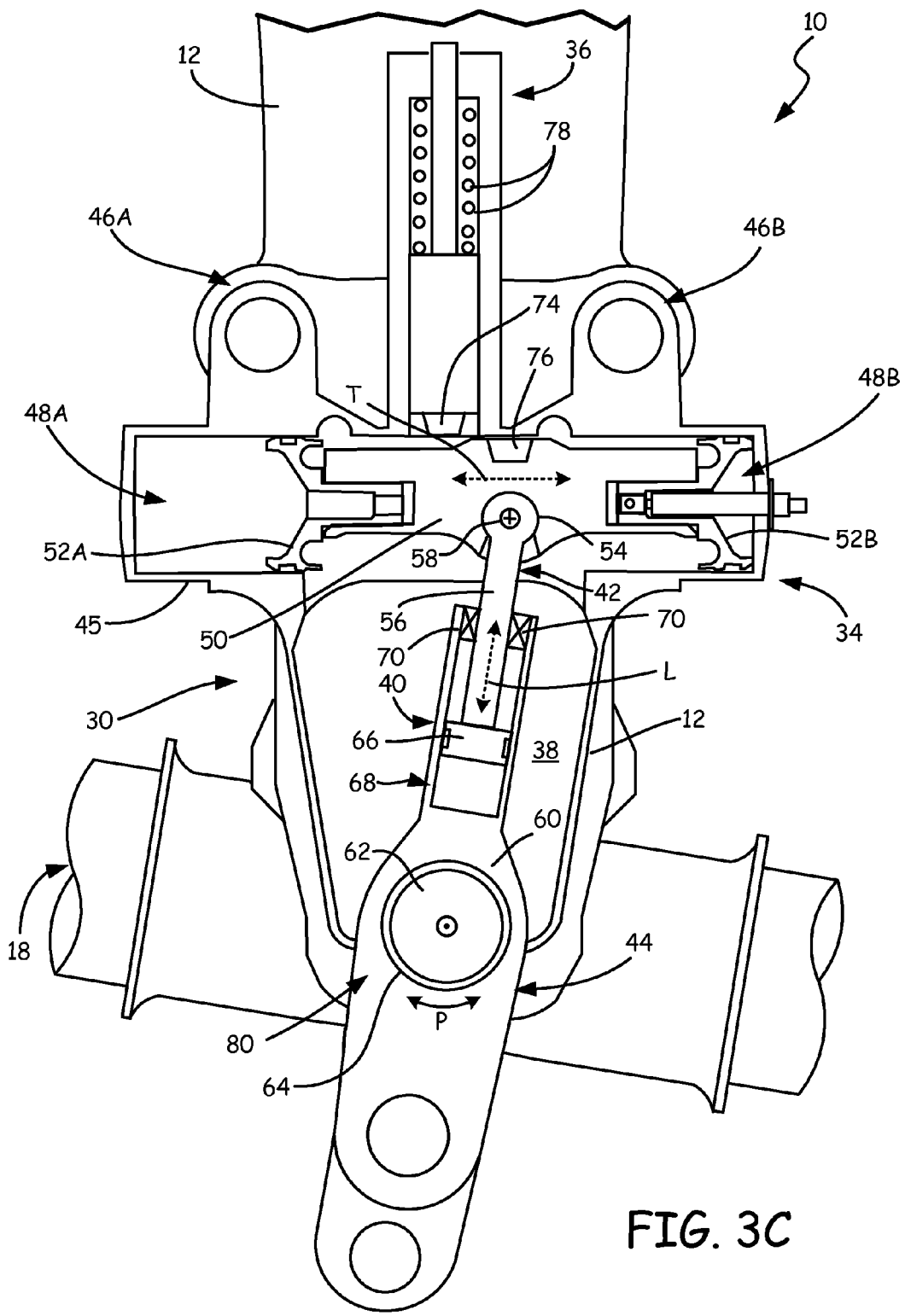
FIG. 3C is a sectional view of the main landing gear assembly showing the compact axle steering arrangement in a clockwise steering position.

FIGS. 3A-3C, taken through line 3-3 of FIG. 2, show a sectional view of main landing gear system 10 in three different steering configurations. FIG. 3A shows main landing gear system 10 with axle steering arrangement 30 and aft axle 18 in a neutral steering position relative to bogie beam 12. FIGS. 3B and 3C respectively show main landing gear system 10 with aft axle 18 in a clockwise and counterclockwise steering position. FIGS. 3A-3C also include linear actuator assembly 34, locking mechanism 36, actuator compartment 38, control link 40, actuator end 42, axle end 44, actuator housing 45, beam attachment regions 46A, 46B, actuators 48A, 48B, steering rack 50, actuator heads 52A, 52B, first control link bore 54, control link arm 56, rack pin 58, control link body 60, axle pivot pin 62, second control link bore 64, arm piston portion 66, control link piston chamber 68, control link sleeve outer stops 70, lock plunger 74, lock recess 76, lock spring 78, and axle attachment region 80.

As seen in FIG. 3A, linear actuator assembly 34 can include actuator housing 45 mounted to bogie beam 12. Here, actuator housing 45 is secured to bogie beam 12 at beam attachment regions 46A, 46B such that it is retained substantially transversely thereto. Within actuator housing 45, two transversely opposed actuators (e.g., hydraulic pistons) 48A, 48B are mounted to steering rack 50. Actuators 48A, 48B are configured to laterally translate rack 50 in direction T by controlling differential hydraulic or other fluid pressures applied to actuator heads 52A, 52B. Alternatively, actuators 48A, 48B can be operated by other means such as electromotive forces applied in and around steering rack 50.

Control link 40, which can be disposed in actuator compartment 38, operatively connects steering rack 50 to pivotable or steerable aft axle 18. As noted above, control link 40 includes actuator end 42 secured to actuator assembly 34, and axle end 44 in pivotable engagement with axle 18. In the example shown in FIGS. 3A-3C, actuator end 42 is secured via first control link bore 54 to steering rack 50, which is in pivotable engagement with control link arm 56. First control link bore 54 can be engaged with control link arm 56, for example, via rack pin 58 or the like. Similarly, FIGS. 3A-3C show control link body 60 with axle pivot pin 62 proximate to a control link pivot point and retained in second control link bore 64 of control link 40.

Control link 40 converts linear motion of steering rack 50 into a pivoting or rotational motion of axle 18 in direction P about a pivot point such as common axis A. Since steering rack 50 is configured to move transversely, but not longitudinally, relative to bogie beam 12, the distance between control link bore 54 and axle pivot pin 62 necessarily varies based on the applied steering inputs and resulting outputs. As such, control link 40 can be configured to extend and retract in longitudinal direction L. Examples of steering operation are shown in FIGS. 3B and 3C.

In the configuration shown in FIG. 3A, actuator assembly 34 is positioned with steering rack 50 located approximately at a midpoint of the actuation range, generally halfway between the transverse extremes shown in FIGS. 3B and 3C. In this FIG. 3A example, control link arm 56 and rack pin 58 are positioned such that the entirety of control link 40 generally overlies the central longitudinal axis of bogie beam 12 when aft axle 18 is oriented in a neutral steering position. For reference this will be referred to as about 50% stroke on a 0% to 100% scale. Alternatively, the configuration of FIG. 3A can be described as 0% stroke on a scale of −100% to +100%.

FIGS. 3B and 3C respectively show an example of how to operate steering arrangement 30 so that aft axle 18 is rotated counterclockwise and clockwise relative to the neutral steering configuration of FIG. 3A. In FIG. 3B, differential pressures are applied to actuator heads 52A, 52B such that actuators 48A, 48B move leftward along direction T, causing actuator assembly 34 to approach 0% stroke. This causes steering rack 50 and control link arm 56 to also move leftward along direction T (via rack pin 58), relative to the longitudinal axis of bogie beam 12 and the forward direction of the aircraft. In turn, actuator end 42 of control link 40 is pulled leftward, causing axle end 44 to pivot counterclockwise in direction P about pivot pin 62 and common axis A. FIG. 3C operates in a similar manner, with differential pressures applied to move actuators 48A, 48B rightward such that actuator assembly 34 approaches 100% stroke, and causes axle end 44 to pivot clockwise in direction P around common axis A.

To achieve these example steering configurations and other configurations through the steering range, control link 40 can be configured to be extendable and retractable in a longitudinal direction L. A longitudinal dimension of control link 40 generally ranges between a first retracted length and a second extended length through a steering range of pivotable aft axle 18. In certain embodiments, a longitudinal dimension of extendable steering control link 40 is approximately equal to the first retracted length when pivotable landing gear aft axle 18 is oriented in or near a neutral steering position (as shown in FIG. 3A). In this configuration, the neutral steering position corresponds to when steering rack 50 is positioned at or proximate the midpoint of an actuation range of actuator assembly 34.

Similarly, a longitudinal dimension of extendable control link 40 can be approximately equal to its second extended length when pivotable aft axle 18 is oriented in a maximum counterclockwise steering position (shown in FIG. 3B) and/or a maximum clockwise steering position (shown in FIG. 3C). These correspond to maximum counterclockwise and clockwise steering inputs respectively. It will be appreciated, however, that in certain of these embodiments, axle steering arrangement 30 may not utilize absolutely all of the extendable range of control link 40 and/or all of the actuation range of actuator assembly 34. For example, landing gear system 10 will invariably experience mechanical and thermal stresses during use. As such control link 40 and/or the other components of axle steering arrangement 30 can be designed with certain tolerances to accommodate expected operational conditions.

In this example, control link 40 is shown as a telescoping link with two coaxially arranged longitudinal segments, arm 56 and body 60. Arm 56 can include piston portion 66 retained in piston chamber 68 of control link body 60. Piston chamber 68 can be, for example, an open chamber formed within control link body 60. Piston chamber 68 can contain a fluid such that piston portion 66 is engaged in any suitable manner such as hydraulically, pneumatically or the like, depending on environmental considerations.

In response to lateral steering motion of linear actuator assembly 34 (as shown in FIGS. 3B and 3C), control link arm 56 is pulled away from control link body 60 such that piston portion 66 moves outward along direction L toward outer stops 70. This effectively lengthens control link 40. As the steering input is returned toward a neutral position (shown in FIG. 3A), control link arm 56 is pushed such that piston portion 66 moves away from outer stops 70 to effectively shorten control link 40.

Previous attempts to implement a transversely mounted actuator included the use of a rack-and-pinion configuration, whereby the rack pivotably engages a pinion shaft via a plurality of intermeshed gear teeth proximate the actuator. While rack-and-pinion configurations are effective for their intended purpose, they require frequent maintenance and inspections to sustain performance. In contrast, control link 40 maintains a secure connection between steering rack 50 and aft axle 18 without the need to clean gear teeth, reset gaps, or perform other frequent maintenance inherent to rack-and-pinion arrangements. At the same time, these configurations have similar weight savings while other operational improvements over push-pull systems remain, making for an effective landing gear steering arrangement.

FIGS. 3A-3C also illustrate an example optional locking mechanism 36. In this example, optional locking mechanism 36 is of the hydraulically actuated type attached to actuator housing 45. Here, plunger or pin 74 is operable to engage recess 76 formed in steering rack 50. Pin 74 can be biased with a resilient element such as spring 78 to automatically lock and maintain a lateral position of steering rack 50 in the absence of hydraulic pressure sufficient to retract plunger 74. Here, locking mechanism 36 maintains steering rack 50 proximate a midpoint of the actuation range (shown in FIG. 3A) corresponding to a neutral steering position. While shown as a hydraulically actuated locking mechanism, it will be appreciated that optional locking mechanism 36 can alternatively be other types of steering locks known in the art. One non-limiting alternative includes a plunger-type lock with a pin oriented normal to steering rack 50 and bogie beam 12. In this alternative example, the locking pin is biased toward a rack or actuator recess using gravity and/or a resilient element. The bias force(s) are counteracted by a hydraulic, pneumatic, or solenoid activated actuator operable to lift the pin out of the recess.

While shown with respect to a two-segment telescoping control link, control link can alternatively be configured as most any other type of longitudinally extendable element. In one non-limiting example, control link 40 includes more than two longitudinal segments, with a corresponding number of interfaces (e.g., pistons and sleeves).

Figure 4:
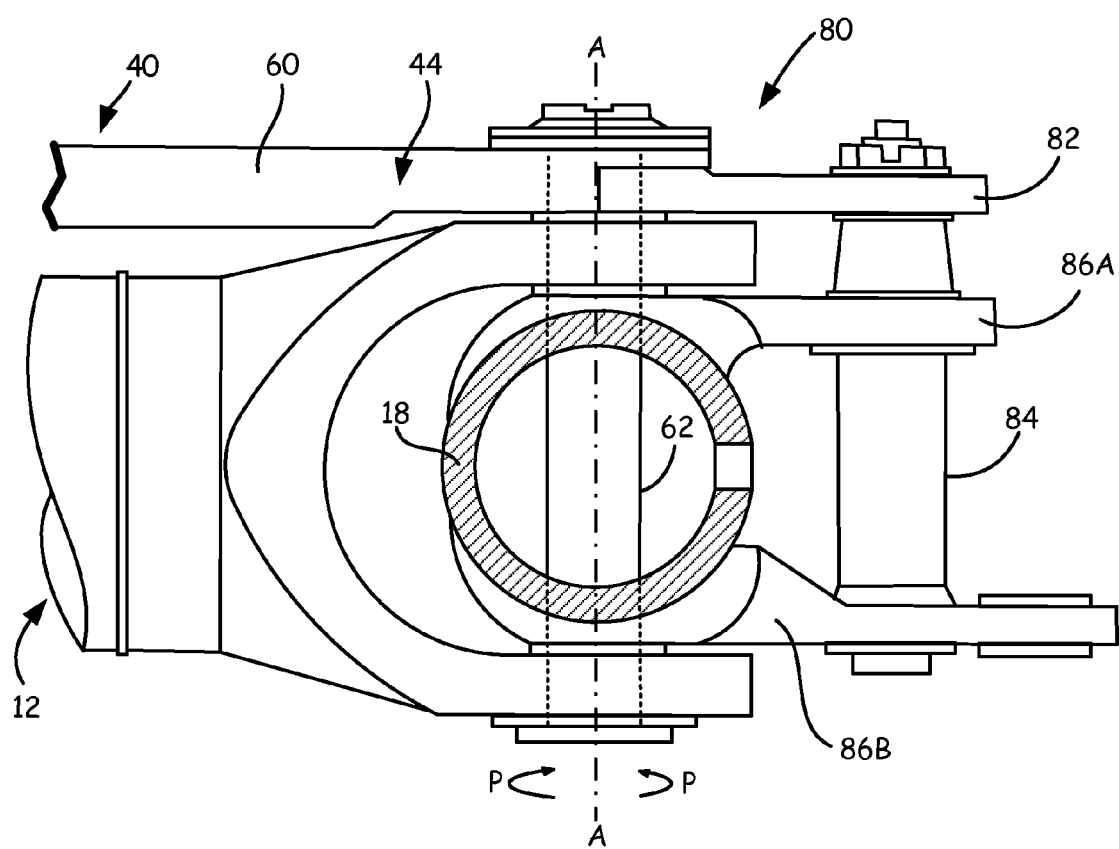
FIG. 4 depicts a side elevation view showing a control link secured to a pivotable axle and a bogie beam.

FIG. 4 shows axle attachment region 80 with an example connection between bogie beam 12, aft axle 18, and control link 40 about common axis A. FIG. 4 also shows control link arm 60, upper lever arm 82, connection pin 84, and lower lever arms 86A, 86B.

As seen in FIG. 4, aft end 44 of control link 40 is engaged with aft axle 18 at axle attachment region 80. In this particular example, upper lever arm 82, which can be secured to control link arm 60, extends aftward from the location of pivot pin 62. Alternatively, upper lever arm 82 can be an integral part of control link 40. A connection bolt or pin 84 connects upper lever arm 82 to corresponding lower lever arms 86A, 86B which also extend aftward from aft axle 18 and pivot pin 62. Connection pin 84 can be parallel to common axis A passing longitudinally through axle pivot pin 62.

As the pivoting motion is imparted to control link aft end 44 by steering rack 50 (shown in FIGS. 3A-3C), this pivoting motion is transferred from upper lever arm 82 through connection pin 84 to lower lever arms 86A, 86B. This in turn transfers the pivoting or steering forces to axle 18 causing both control link 40 and aft axle 18 to pivot relative to bogie beam 12 about common axis A. While shown and described in the context of a single connection bolt or pin 84, it will be appreciated that multiple connection bolts or pins can be used in its place.

Figure 5:
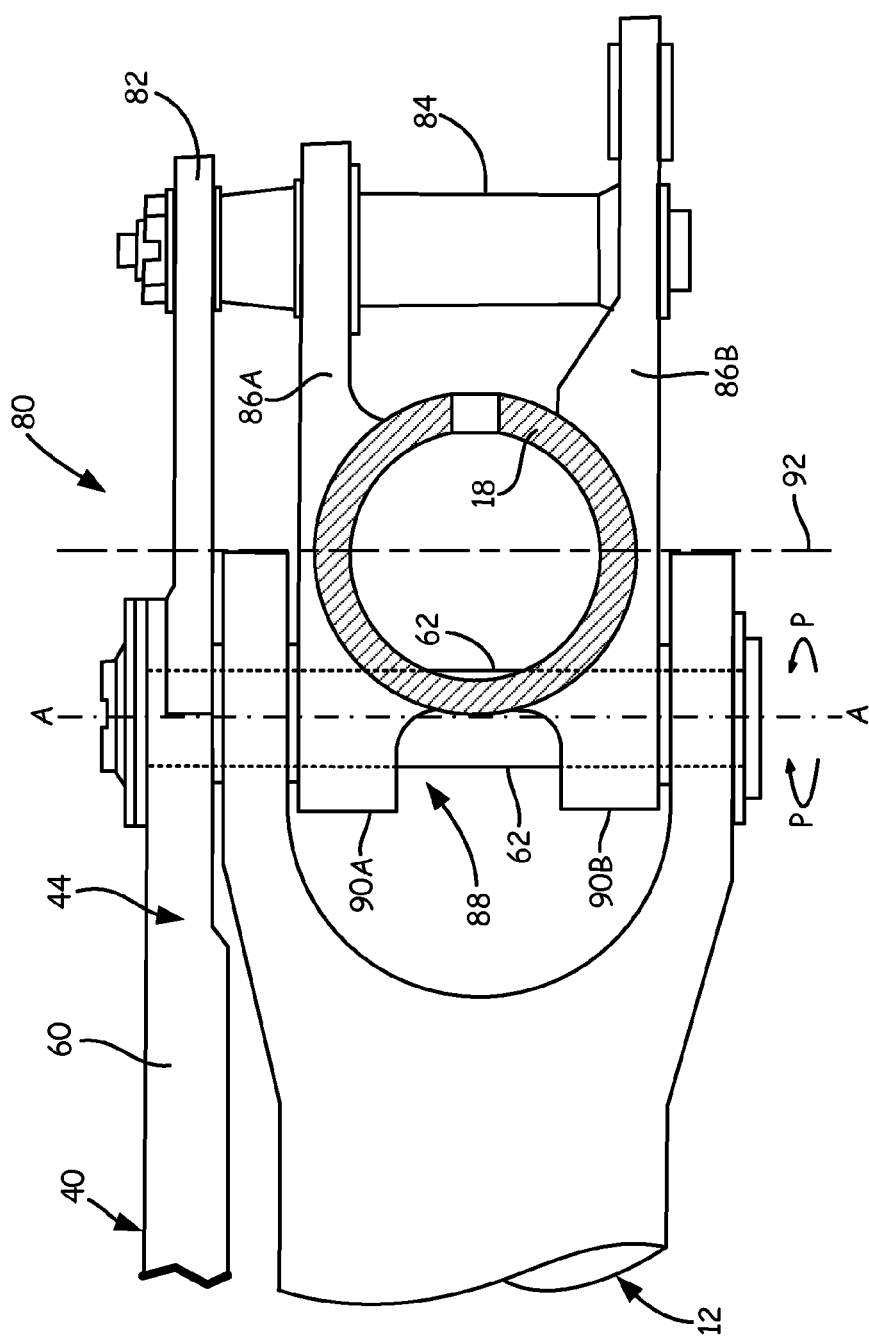
FIG. 5 is an alternative embodiment showing a side elevation view of a control link secured to a pivotable axle with a mechanical trail.

FIG. 5 shows axle attachment region 80 with an alternative connection between bogie beam 12, aft axle 18, and control link 40 about common axis A. FIG. 5 also shows control link arm 60, upper lever arm 82, connection pin 84, lower lever arms 86A, 86B, trail arms 90A, 90B, and axle diameter center line 92.

Similar to FIG. 4, FIG. 5 shows aft end 44 of control link 40 engaged with aft axle 18 at axle attachment region 80. In this alternative example, control link arm 60 is engaged with aft axle 18 via pivot pin 62 passing through trail arms 90A, 90B. However, unlike in FIG. 4, pivot pin 62 and common axis A are not coincident with axle diameter center line 92. In FIG. 5, trail arms 90A, 90B receive pivot pin 62 at a location longitudinally spaced apart from axle diameter center line 92. This has the effect of causing aft axle 18 to trail bogie beam 12 while still allowing aft axle 18 to pivot about common axis A. This results in a nonzero mechanical trail distance between common axis A and a ground contact point of wheels 20 (shown in FIG. 1). The ground contact point of wheels 20 is generally coincident with axle diameter line 92.

As the pivoting motion of control link aft end 44 is transferred from upper lever arm 82 through connection pin 84 to lower lever arms 86A, 86B, pivoting or steering forces are still transmitted to axle 18, causing both control link 40 and aft axle 18 to pivot about common axis A. An increased mechanical trail distance can, in certain embodiments, improve directional stability of aft axle 18.

It should be noted that the subject matter has been described with reference to an example axle steering arrangement where the midpoint of the actuation range corresponds generally to a neutral steering position of the pivotable axle. However, it will be appreciated that this disclosure is not so limited. For example, the example steering arrangements described herein can be adapted to include a bias steering arrangement, such as is described in a commonly assigned United States Patent Application entitled "Main Landing Gear Bias Axle Steering" and filed on an even date herewith.

While the subject matter has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A landing gear system comprising:
a bogie beam;
a landing gear axle pivotally mounted to the bogie beam;
a steering rack secured transversely to the bogie beam and
longitudinally spaced apart from the landing gear axle;

a linear actuator assembly mounted to the steering rack including at least one transversely oriented actuator operable to laterally translate the steering rack transversely to the bogie beam; and a variable length steering control link operatively connecting the steering rack to the pivotally mounted landing gear axle, the steering control link having an actuator end secured to the steering rack, and an axle end engaged with the landing gear axle, the steering control link and the landing gear axle pivotable relative to the bogie beam about a common axis;

wherein the steering control link is longitudinally extendable and retractable in response to transverse movement of the steering rack to maintain the connection between the steering rack and the landing gear axle.

2. The landing gear assembly of claim 1, wherein a longitudinal dimension of the steering control link ranges between a first retracted length and a second extended length through a steering range of the pivotable landing gear axle.

3. The landing gear assembly of claim 2, wherein the longitudinal dimension of the steering control link is approximately equal to the first retracted length when the landing gear axle is oriented in a neutral steering position.

4. The landing gear assembly of claim 2, wherein the longitudinal dimension of the steering control link is approximately equal to the second extended length when the landing gear axle is oriented in at least one of: a maximum clockwise steering position, and a maximum counterclockwise steering position.

5. The landing gear assembly of claim 1, further comprising:

a pivot pin extending through the steering control link, the landing gear axle, and the bogie beam at the common axis.

6. The landing gear assembly of claim 1: further comprising:

at least one trail arm; and a pivot pin extending through the steering control link, the at least one trail arm, and the bogie beam at the common axis;

wherein the pivot pin is at a location longitudinally spaced apart from an axle diameter center line.

7. The landing gear assembly of claim 1, further comprising:

a locking mechanism operable to engage one or more of: the landing gear axle, the steering rack, the linear actuator assembly, and the steering control link, and lock the landing gear axle against inadvertent steering movements.

8. The landing gear assembly of claim 1, further comprising:

a plurality of fixed landing gear axles mounted to the bogie beam;

wherein the pivotally mounted landing gear axle is disposed aft of the plurality of fixed landing gear axles.

9. The landing gear assembly of claim 1, wherein the steering control link is a telescoping control link comprising an arm segment coaxially engaged with a body segment.

10. The landing gear assembly of claim 9, wherein the arm segment is pivotably engaged with the steering rack, and the body segment is pivotably engaged with the landing gear axle and the bogie beam about the common axis.

11. A steering arrangement for a pivotable landing gear axle, the steering arrangement comprising:

a steering rack;

a linear actuator assembly including at least one actuator mounted to, and operable to laterally translate the steering rack; and a variable length steering control link including an actuator end having at least one location for securement to the steering rack, and an axle end opposite the actuator end, the axle end having at least one location securing the landing gear axle such that the axle end is pivotable about a control link pivot point in response to linear movement of the steering rack.

12. The steering arrangement of claim 11, further comprising:

a pivot pin received by the control link axle end proximate the control link pivot point.

13. The steering arrangement of claim 11, wherein a longitudinal dimension of the steering control link ranges between a first retracted length and a second extended length.

14. The steering arrangement of claim 13, wherein the longitudinal dimension of the steering control link is approximately equal to the first retracted length when the steering rack is positioned at a midpoint of an actuation range.

15. The steering arrangement of claim 13, wherein the longitudinal dimension of the steering control link is approximately equal to the second extended length when the steering rack is positioned at a maximum steering input.

16. The steering arrangement of claim 11, wherein the steering control link is a telescoping control link comprising an arm segment coaxially engaged with a body segment.

17. The steering arrangement of claim 16, wherein the arm segment is pivotably engaged with the steering rack.

18. The steering arrangement of claim 16, wherein the arm segment includes a piston portion movable longitudinally within a chamber disposed in the body segment.

19. The steering arrangement of claim 11, further comprising:

a locking mechanism attached to an actuator housing, the locking mechanism including at least one pin operable to engage and maintain a lateral position of the steering rack.

* * * * *